(12) United States Patent
King

(10) Patent No.: US 10,995,579 B2
(45) Date of Patent: *May 4, 2021

(54) STUFFING BOX CONTAINMENT APPARATUS

(71) Applicant: Jayson King, Corning (CA)

(72) Inventor: Jayson King, Corning (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,196

(22) Filed: Apr. 11, 2019

(65) Prior Publication Data

US 2019/0234172 A1 Aug. 1, 2019

Related U.S. Application Data

(63) Continuation of application No. 15/744,996, filed as application No. PCT/CA2016/050880 on Jul. 28, 2016, now Pat. No. 10,301,899.

(30) Foreign Application Priority Data

Jul. 28, 2015 (CA) ................................ CA 2898600

(51) Int. Cl.
*E21B 33/08* (2006.01)
*F16J 15/00* (2006.01)
*F16J 15/18* (2006.01)
*E21B 33/03* (2006.01)

(52) U.S. Cl.
CPC .............. *E21B 33/08* (2013.01); *E21B 33/03* (2013.01); *F16J 15/004* (2013.01); *F16J 15/18* (2013.01)

(58) Field of Classification Search
CPC ......... E21B 33/03; E21B 33/08; F16J 15/004; F16J 15/18
See application file for complete search history.

(56) References Cited

U.S. PATENT DOCUMENTS

| | | | |
|---|---|---|---|
| 4,672,845 A | 6/1987 | Hirsch et al. | |
| 4,872,508 A | 10/1989 | Gordon | |
| 5,150,751 A | 9/1992 | Burton et al. | |
| 5,167,277 A | 12/1992 | Evans | |
| 5,228,506 A * | 7/1993 | Pearce | E21B 33/08 166/81.1 |
| 5,288,506 A | 2/1994 | Spickett et al. | |
| 5,351,753 A | 10/1994 | Golson | |

(Continued)

FOREIGN PATENT DOCUMENTS

CA 2743825 A1 2/2012

*Primary Examiner* — Nicole Coy
(74) *Attorney, Agent, or Firm* — Standley Law Group LLP

(57) ABSTRACT

A containment device for containing leakage from a stuffing box is provided. The containment device can have a base defining an interior space, a structural member positioned substantially vertically with an interior passage sized to allow a polish rod to pass through and a lid. The containment device can be adapted for connection to the stuffing box so that a bottom of the structural member rests on the stuffing box when the containment device is installed on the stuffing box. The containment device can be installed by removing a dust cap from the stuffing box and attaching the containment device to a top of the stuffing box with the interior passage aligning with the stuffing box. The dust is installed on top of the lid and the lid placed on the base. The polish rod can then be run through the interior passage of the containment device.

18 Claims, 9 Drawing Sheets

(56) References Cited

U.S. PATENT DOCUMENTS

| | | | |
|---|---|---|---|
| 5,394,939 A | 3/1995 | Walker | |
| 5,484,024 A | 1/1996 | Ladd et al. | |
| 5,549,156 A * | 8/1996 | Borden | E21B 33/08 |
| | | | 166/84.2 |
| 5,865,245 A * | 2/1999 | Trout | E21B 33/08 |
| | | | 166/177.3 |
| 6,286,593 B1 | 9/2001 | Holtby | |
| 8,127,838 B2 | 3/2012 | Brewer et al. | |
| 9,632,512 B2 | 4/2017 | Holtby et al. | |

* cited by examiner

STUFFING BOX CONTAINMENT APPARATUS

The present invention relates to an apparatus for containing leaks from a stuffing box on a well head that is used for pumping oil out of the ground.

BACKGROUND

Oil wells are used to remove oil from subterranean reservoirs. Typically, the oil is removed from the well using artificial lift techniques which cause the oil to be pumped up the well to the ground surface. A common artificial lift technique is the use of a downhole pump that has a device at the bottom of the well that is used to pump the oil up the well to the ground surface. The device at the bottom of the well is driven by a string of sucker rods that extend from the ground surface down to the pumping device and by reciprocating the string of sucker rods up and down in the well, the pumping device is driven causing it to pump oil up the well. The sucker rods are reciprocated at the ground surface typically with a pump jack or other device.

When a pump jack is used to cause the reciprocating of the sucker rods, a head of the pump jack is typically connected by a bridle to a polish rod that passed into the well head. The well head caps the top of the well and the polish rod is inserted into the well head through a stuffing box that is connected to the top of the well head. The stuffing box is meant to prevent liquid from the well leaking out where the polish rod enters into the well. The stuffing box contains packing (or stuffing) inside of it which presses against the polish rod as it move up and down in the stuffing box forming a seal and preventing oil and other liquid from escaping along the polish rod and out of the well head. The polish rod has a smooth (i.e. polished) surface meant to form a better seal with the packing in the stuffing box.

The stuffing box, however, is not infallible and it is possible for it to leak. In some cases if liquid stops being pumped up the well for a period of time, such as if the pump jack is stopped or liquid stops flowing from downhole, the packing in the stuffing box can dry out and when the pumping of oil or other liquid up the well begins again, some of this liquid may leak out past the dried packing. If the pump jack continues to reciprocate while the packing has dried out, the packing might become damaged by the movement of the polish rod past it. Sometimes the packing might just wear out over time and it is not until oil is detected leaking out of the stuffing box that it is discovered that the packing has worn out.

Leaking oil is obviously a problem because the oil or other liquid can leak out the stuffing box and run down the well head where it can contaminate the ground surrounding the well head. If left for long enough, a large amount of oil can collect around the well head.

A number of containment devices have been devised to try and contain any fluid leaking out of the containment box, but they typically involve enclosing the entire stuffing box to try and contain any leaks. Enclosing the entire stuffing box can make it hard or even impossible to access the stuffing box for maintenance without removing some or all of the containment device, this is especially troublesome on stuffing boxes that use bolts that must be frequently tightened to compact the packing as it wears to keep the seal between the packing and polish rod. Additionally, many of these have relatively open tops which allow rain water to collect in them and they may fill up with rain water, surrounding the stuffing box in water.

Many of these prior art devices also have multiple pieces that connect or "snap" together in place around the stuffing box. While this can make these devices easier to install, the result is that there are seams in the devices where the pieces are joined together. While they seals are originally used, these prior art devices can leak if improperly installed (i.e. snapped together) or over time if the seals dry out or become aged.

Additionally, when service is performed on the pump string it can involve hanging the pump string on the well head. This typically involves placing a collar on the polish rod or other portion of the pump string and letting the weight of the entire pump string hang on the top of the well head (i.e. the top of the stuffing box). Typically, these previous devices are not strong enough to support the entire weight of the pump string so they must be removed so that the weight of the pipe string can rest of the stuffing box.

SUMMARY OF THE INVENTION

In a first aspect, a containment device for containing leakage from a stuffing box is provided. The containment device comprises a base having a bottom and an open top, the base defining an interior space, a structural member positioned substantially vertically in the interior space of the base, the structural member having an interior passage sized to allow a polish rod to pass through the interior passage and a lid having an opening aligned with the interior passage when the lid is placed on the base. The containment device is adapted for connection to the stuffing box so that a bottom of the structural member rests on the stuffing box when the containment device is installed on a top of the stuffing box.

In a second aspect, a method for containing leakage from a stuffing box is provided. The method comprises providing a containment device having: a base with a bottom and an open top, the base defining an interior space; a structural member positioned substantially vertically in the interior space of the base, the structural member having an interior passage sized to allow a polish rod to pass through the interior passage; and a lid having an opening aligned with the interior passage when the lid is placed on the base, removing a dust cap from the stuffing box and attaching the containment device to a top of the stuffing so that the interior passage aligns with the stuffing box, installing the dust cap on top of the lid of the containment device, placing the lid on the base and running the polish rod through the interior passage of the containment device.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
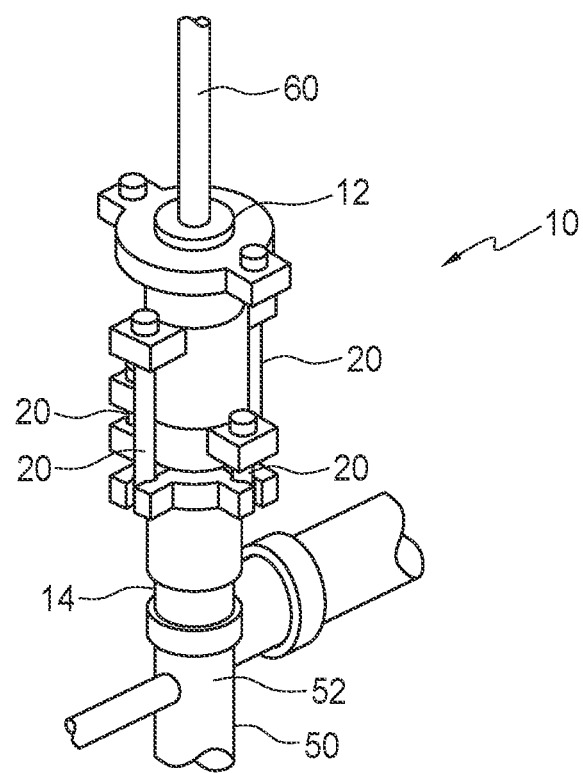
FIG. 1 is a perspective view of a typical stuffing box.

FIG. 1 illustrates a typical stuffing box 10 provided on a well head 50. A polish rod 60 reciprocates in and out of the top of the stuffing box 10 through a dust collar 12. A base 14 of the stuffing box 10 is connected to the top of the well head 50 above a pumping tee 52 that draws oil and other liquids away from the top of the well head 50 for storage. Tightening bolts 20 can be provided around the stuffing box 10 so that periodically these tightening bolts 20 can be tightened to compress the stuffing box 10 and place pressure on the packing (not shown) in the stuffing box 10 to force the packing against the polish rod 60 as it reciprocates in and out of the stuffing box 10. By slowly tightening up these tightening bolts 20 over time, the packing can be caused to continue to form a seal against the polish rod 60 as the packing wears.

Figure 2:
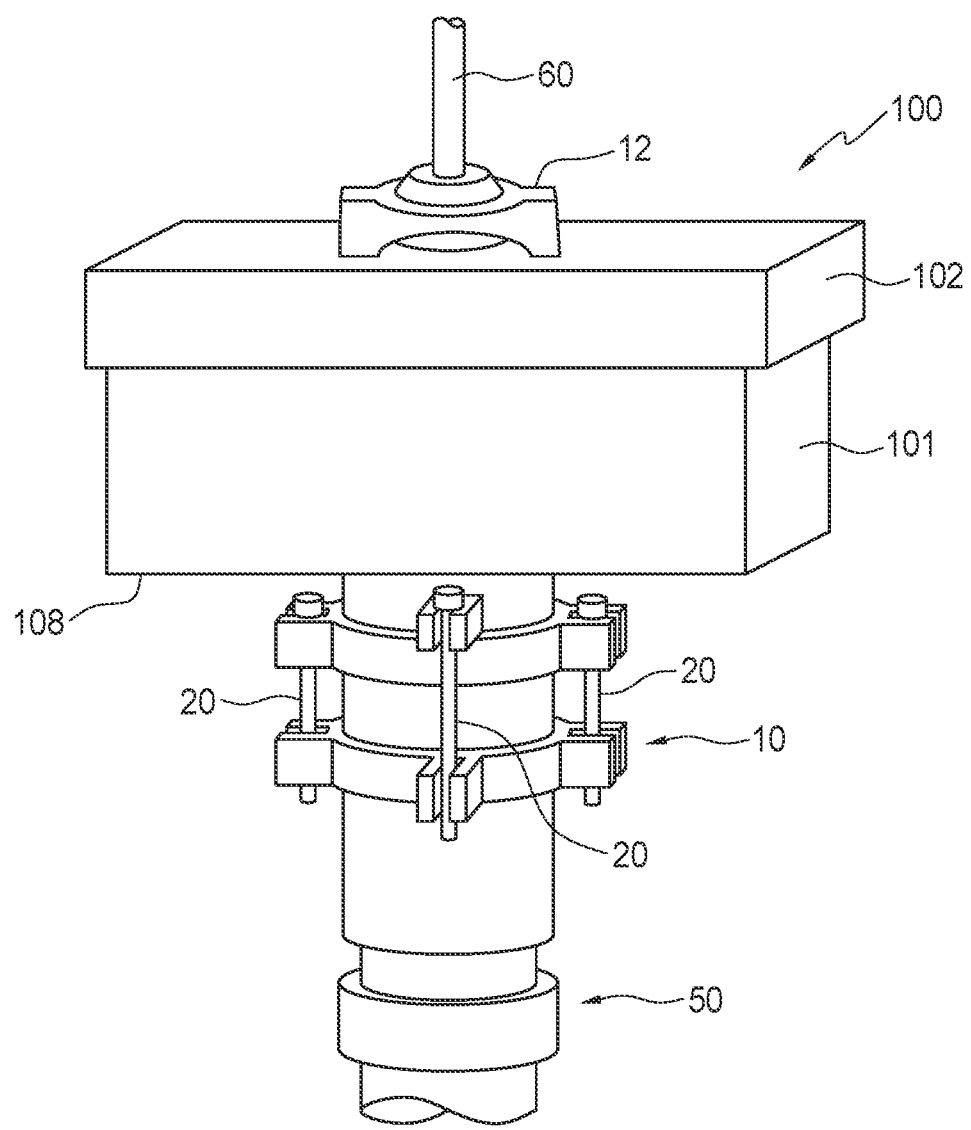
FIG. 2 is a perspective view of a containment device positioned on top of a stuffing box.

FIG. 2 illustrates a containment device 100 installed in position on top of the stuffing box 10. While the containment device 100 in FIG. 2 has a rectangular shape, a person skilled in the art would understand that a number of shapes would work equally well.

Figure 3:
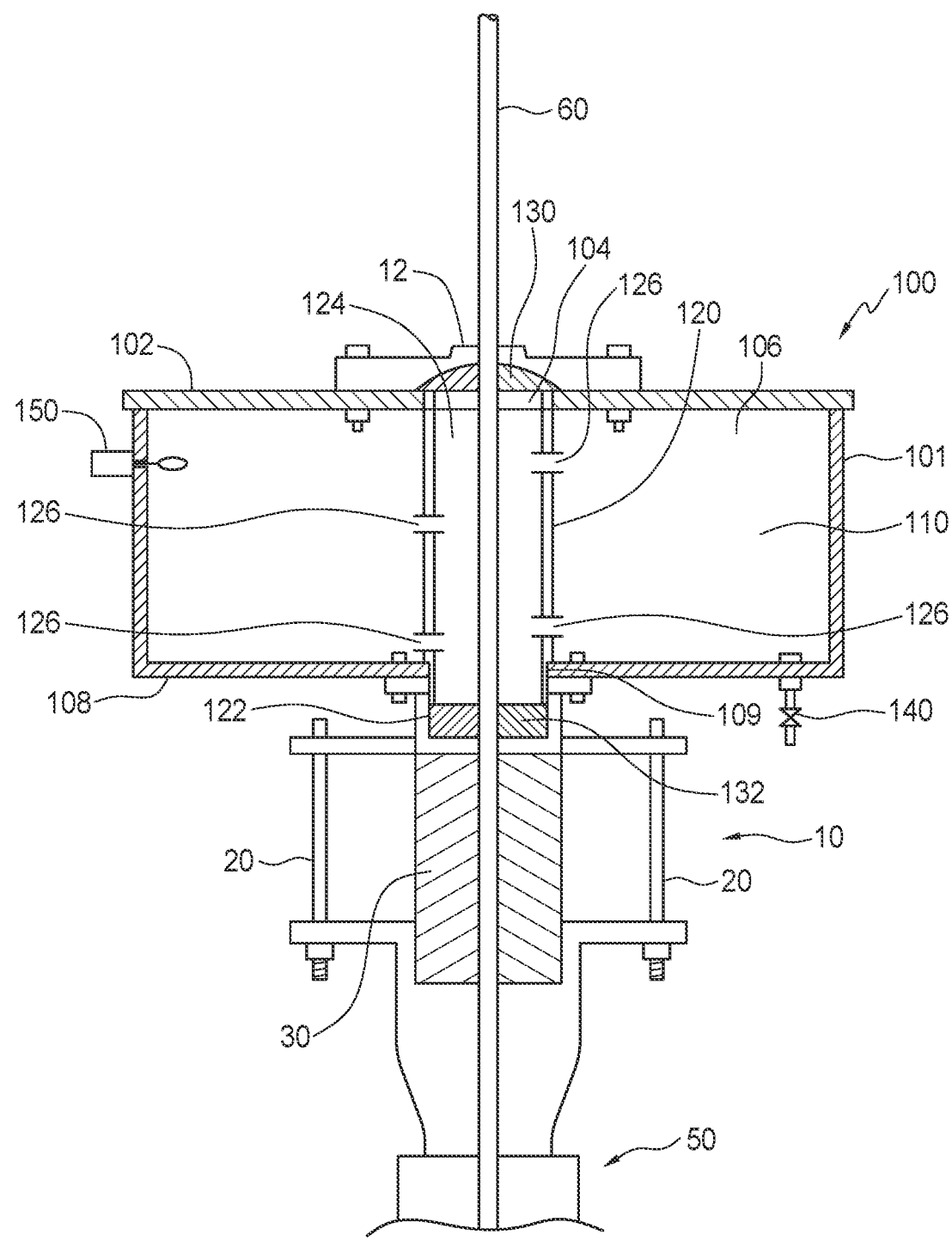
FIG. 3 is a schematic cut-away view of the containment device and stuffing box of FIG. 2.

FIG. 3 illustrates a schematic cut-away view of the containment device 100 on the stuffing box 10. The containment device 100 has a base 101 and a lid 102. Rather than enclosing the stuffing box 10, the containment device 100 is positioned on top of the stuffing box 10 leaving the tightening bolts 20 easily accessible for anyone conducting maintenance on the stuffing box 10. Packing 30 in the stuffing box 10 forms a seal with the outer surface of the polish rod 60 to prevent oil or other liquid from leaking out of the stuffing box 10. Because any oil leaking out of the stuffing box 10 will almost always occur where the polish rod 60 enters the top of the stuffing box 10, attaching the containment device 100 to the top of the stuffing box 10 will collect any oil that leaks out just as if the entire stuffing box 10 was enclosed.

The base 101 of the containment device 100 can have an interior space 110 that forms a chamber to contain any oil or other liquid that has leaked out of the stuffing box 10 and entered the interior space 110 of the containment device 100. The base 101 of the containment device 100 can be a one-piece unit with the interior space 110 not having any seams or joins as it would if the base 101 was made up of multiple pieces that join around the stuffing box 10. Instead the base 101 of the containment device 100 can have one seamless interior surface surrounding the interior space 110 to prevent any leaks from seams or joins over time. The base 101 can have an open top 106 and a bottom 108.

A lid 102 can be provided to fit over the open top 106 of the base 101 and cover the interior space 110. An interior passage runs through the containment device 100 and allows the polish rod 60 to pass through the containment device 100 and into the stuffing box 10.

Figure 4:
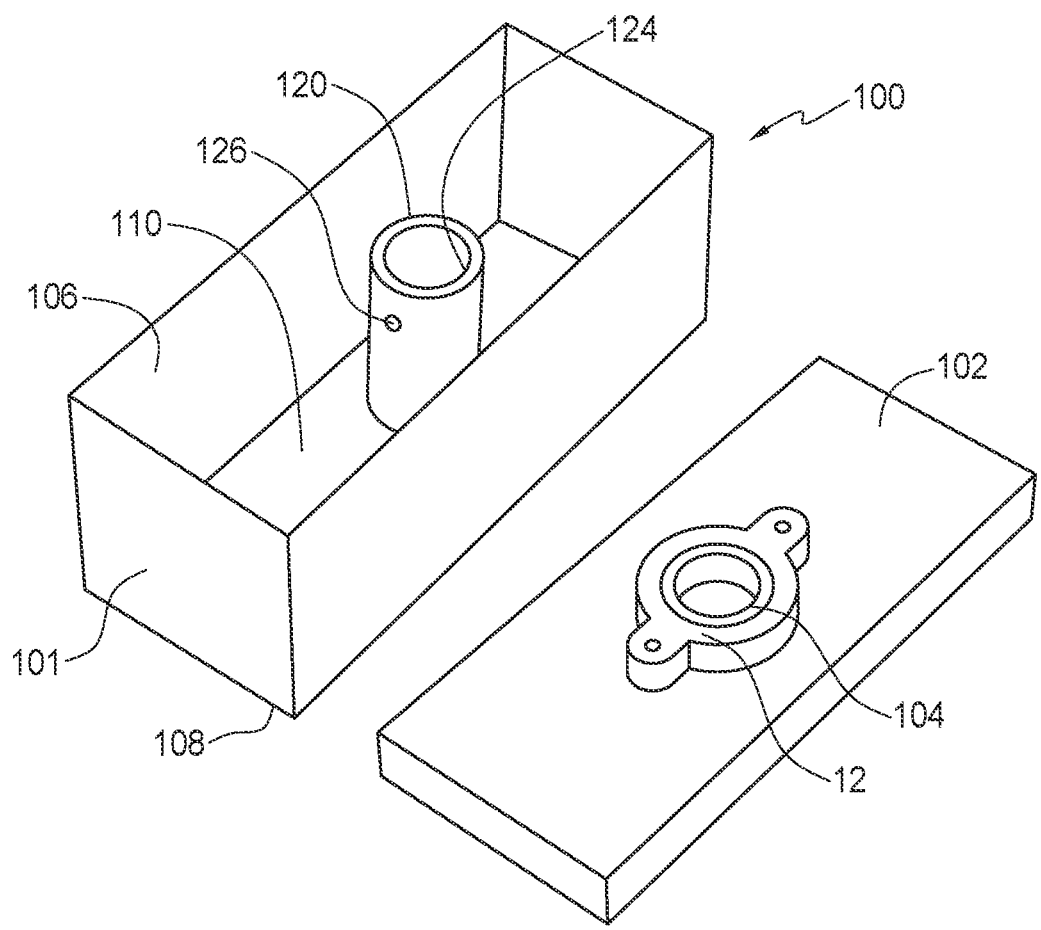
FIG. 4 is a top perspective view of the containment device of FIG. 2 with the lid removed to show an interior space and a structural member in the interior space.

A structural member 120 can extend from the top of the containment device 100 through the interior space 110. FIG. 4 shows the structural member 120 positioned inside the interior space of the containment device 100. The structural member 120 will align with an opening 109 in the bottom 108 of the base 101. In one aspect, this structural member 120 can extend through the opening 109 in the bottom 108 of the base 101 and slightly below the bottom 108 of the containment device 100 so that a bottom end 122 of the structural member 120 can come into contact with upper packing 130 placed on top of the stuffing box 10. The structural member 120 can have an interior passage 124 sized and positioned to allow the polish rod 60 to pass through this interior passage 124 and thereby the containment device 100. The interior passage 124 of the structural member 120 along with a corresponding opening 104 in the lid 102 can form the interior passage that passes through the entire height of the containment device 100. In one aspect, the structural member 120 can be a rigid pipe positioned to pass vertically through the containment device 100 and make contact with the top of the stuffing box 10. The structural member 120 can support the weight of the pump string and transfer the weight of the pump string through the structural member 120 to the stuffing box 10 and thereby to the well head 50 when the pump string is hung on the top of the containment device 100.

A number of apertures 126 can pass through the structural member 120 to place the interior passage 124 of the structural member 120 in fluid communication with the interior space 110 of the containment device 100. In this manner, oil or other liquid that has leaked out the top of the stuffing box 10 where the polish rod 60 enters the stuffing box 10 can build up in the inside of the structural member 120 until it reaches one of the apertures 126 in the structural member 120 and flow into the interior space 110 of the containment device 100.

The containment device 100 can be installed in position on top of the stuffing box 10 by removing the dust cap 12 from the top of the stuffing box 10 and then attaching the bottom of the containment device 100 to the flange on the top of the stuffing box 10 that previously held the dust cap 12. The containment device 100 could be attached by inserting bolts through the bottom 108 of the base 101 of the containment device 100 and using the bolts to attach the containment device 100 to the flange on the top of the stuffing box 10. Gaskets or seals can be used with the bolts to prevent oil or other fluids that have collected in the containment device 100 to leak out around the bolts.

Because the containment device 100 is a solid piece without seams and does not separate into a number of pieces for installation, the containment device 100 must be first positioned on top of the stuffing box 10 and then the pump string must be lowered through the interior passage in the containment device 100 with it being lowered through the opening 104 in the lid 102 and through the interior passage 124 of the structural member 120.

Typically, a gasket or other seal is provided between the top of the stuffing box 10 and the containment device 100. The polish rod 60 can run through the inside of the structural member 120 in the containment device 100. Lower packing 132 can be placed on top of the stuffing box 10 between the top of the stuffing box 10 and the bottom end of the structural member 120 so that any oil or other liquid that leaks out the top of the stuffing box 10 may be scraped off the polish rod 60 by the lower packing 132.

The dust cap 12 can be re-used by attaching to the lid 102 of the containment device 100. With the dust cap 12 in place on the lid 102 of the containment device 100 it can prevent rainwater from entering the containment device 100. The upper packing 130 provided between the lid 102 of the containment device 100 and the dust cap 12 can prevent oil or other liquid that has leaked out of the stuffing box 10 from riding up the polish rod 60 and out the top of the containment device 100. Instead, the upper packing 130 can scrape this oil or other liquid off the polish rod 60 keeping it in the containment device 100.

A drain plug 140 can be provided in the bottom 108 of the base 101 of the containment device 100 to allow liquid that has collected in the containment device 100 to be drained out the drain plug 140 to be disposed of or otherwise dealt with.

A high-level alarm switch 150 can be provided in the containment device 100 to trigger an alarm when liquid in the interior space 110 of the containment device 100 reaches the height of the switch high-level alarm switch 150. The alarm could include sending a signal to stop the pump jack to prevent any more liquid from escaping from the well because of the reciprocation of the pump string. In one aspect, the high-level alarm switch 150 could be a switch with a float that is switched when liquid in the containment device 100 reaches high enough to cause the float to float and flips the switch.

In operation, as the polish rod 60 and the pump string reciprocates in and out of the well head 50 through the stuffing box 10, if any oil or other liquid leaks out of the stuffing box 10 between the stuffing box 10 and the polish rod 60, it can be carried up into the containment device 100 where it can be wiped off by the upper packing 130, if it rides the polish rod 60 up that high. The liquid can then collect in the containment device 100. Initially, this liquid can collect in the interior passage 124 of the structural member 120 until the liquid reaches a high enough level inside the interior passage 124 that it reaches one of the apertures 126 passing through the structural member 120. Once the liquid in the interior passage 124 of the containment device 100 reaches the height of one of the apertures 126 it can pass through the aperture 126 and into the interior space 110 of the containment device 100 where it will then be contained in the containment device 100. A person can then periodically check the interior space 110 of the containment device 100 by removing the lid 102 and looking inside to see if any liquid is accumulating in the containment device 100 and how much. Alternatively, if liquid reaches the high-level alarm switch 150, the operator can react to the alarm that is set off. The collected liquid can be removed from the containment device 100 through the drain 140.

If work is to be performed on the pump string, well head or pump jack, the pump string can be hung from the top of the containment device 100 instead of removing the entire containment device 100 and allowing the pump string to hang from the top of the stuffing box 10 and thereby they top of the well head 50. Because the containment device 100 is a solid piece with a lid 102, it cannot be removed from the top of the stuffing box 10 without removing the entire pump string from the well. However, the containment device 100 is designed to hold the entire weight of the pump string. When the pump string is hung from the top of the containment device 100 the structural member 120 can support the weight of the pump string and transfer the weight of the pump string through the structural member 120 to the top of the stuffing box 10 and the well head 50. In this manner, the weight of the pump string will be placed on the well head 50 just as if the containment box 100 was not there and the structural member 120 will prevent the weight of the hanging pump string from crushing the containment device 100.

In a further aspect, oil or another lubricating liquid may be purposely kept in the interior space 110 of the containment device 100 at a high enough level that this oil or other lubricating liquid can pass through one of the apertures 126 and inside the structural member 120 so that the polish rod 60 is lubricated with this oil or other lubricating oil inside the structural member 120. In this manner, the oil or other lubricating oil can keep the upper packing 130 and lower packing 132 lubricated and even the packing 30 in the stuffing box 10 preventing it from being damaged should the well stop producing oil for a period of time.

Figure 5:
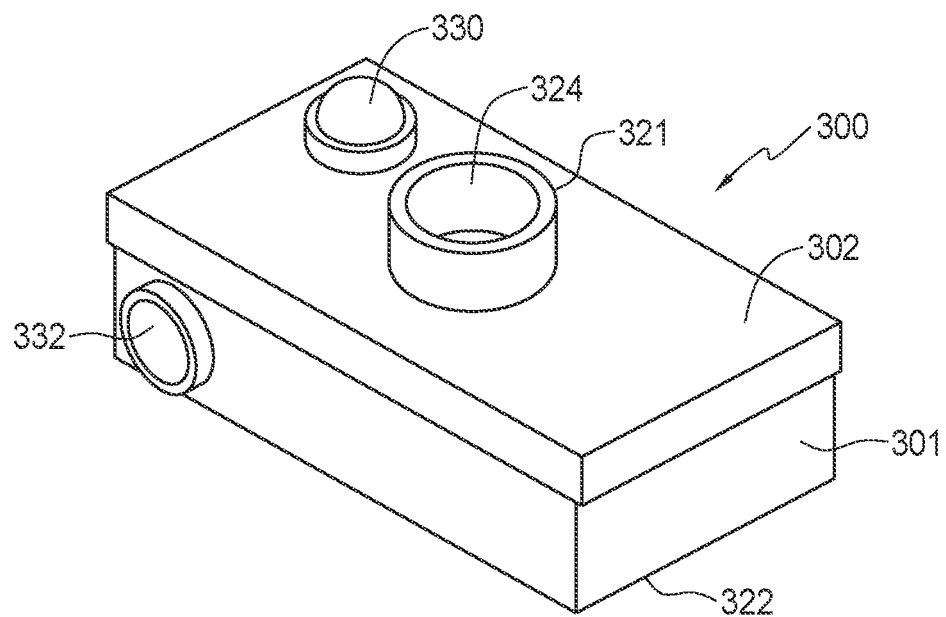
FIG. 5 is a perspective view of a containment device in another aspect.
Figure 6:
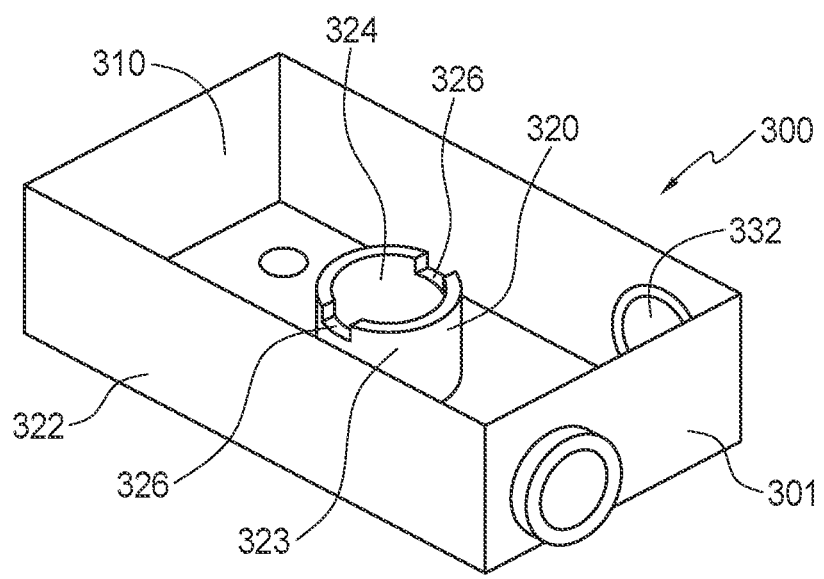
FIG. 6 is a perspective view of the containment device of FIG. 5 with the lid removed.

FIGS. 5 and 6 illustrate a containment device 300 in another aspect. Containment device 300, similar to containment device 100, can have a base 301 and a lid 302. A structural member 320 can be positioned vertically in an interior space 310 defined by the base 301. The structural member 320 can define an interior passage 324 through which a polish rod can extend through the containment device 300 and out an opening in a bottom end 322 of the base 301.

The containment device 300 can have a first window 330 and a second window 332 to allow a person to see inside the interior space 310 without removing the lid 302. The first window 330 can be provided on the lid 302 and the second window 332 can be provided on the side of the base 301.

The structural member 320 can have apertures 326 provided proximate a top of a lower portion 323 of the structural member 320. One of these apertures 326 can be used to allow oil or other liquids that have leaked into the interior passage 324 to pass into the interior space 319 defined by the base 301.

An upper portion 321 of the structural member 320 can be provided attached to the lid 302 of the containment device 300. This upper portion 321 of the structural member 320 can rest on a top of a lower portion 323 of the structural member 320 which in turn will rest on top of the stuffing box 10 when the containment device 300 is installed on top of the stuffing box 10.

Figure 7:
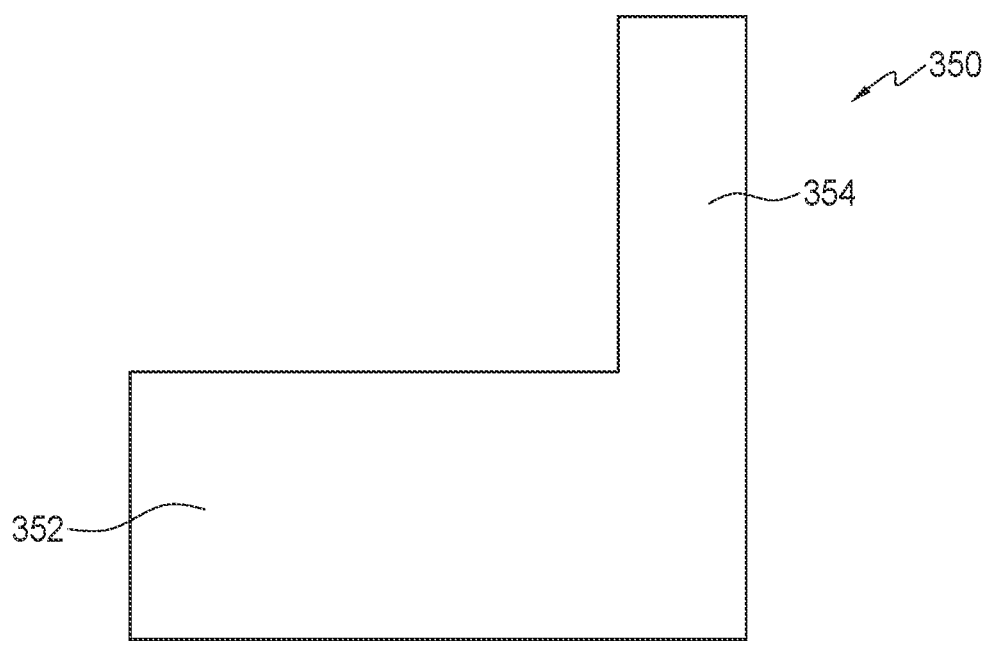
FIG. 7 is a top view of a wick.
Figure 8:
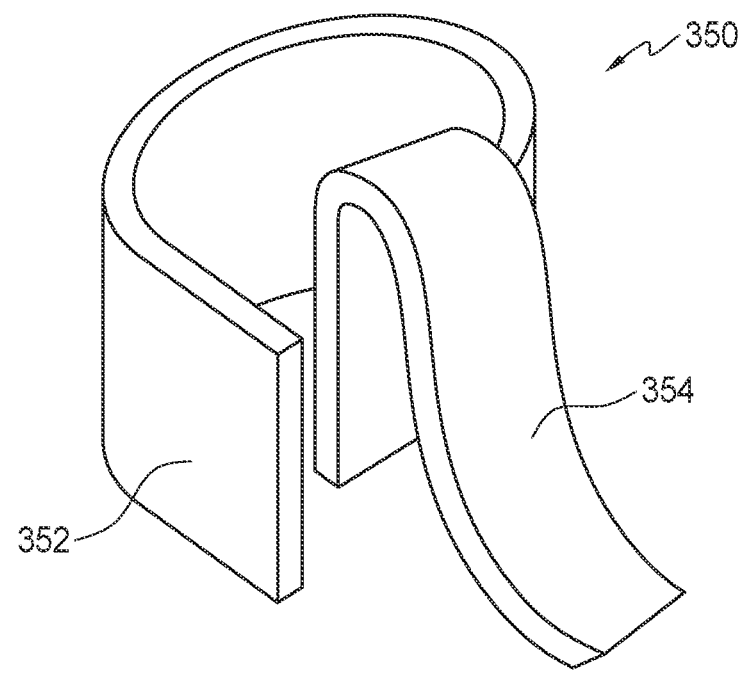
FIG. 8 is a perspective view of the wick of FIG. 7.
Figure 9:
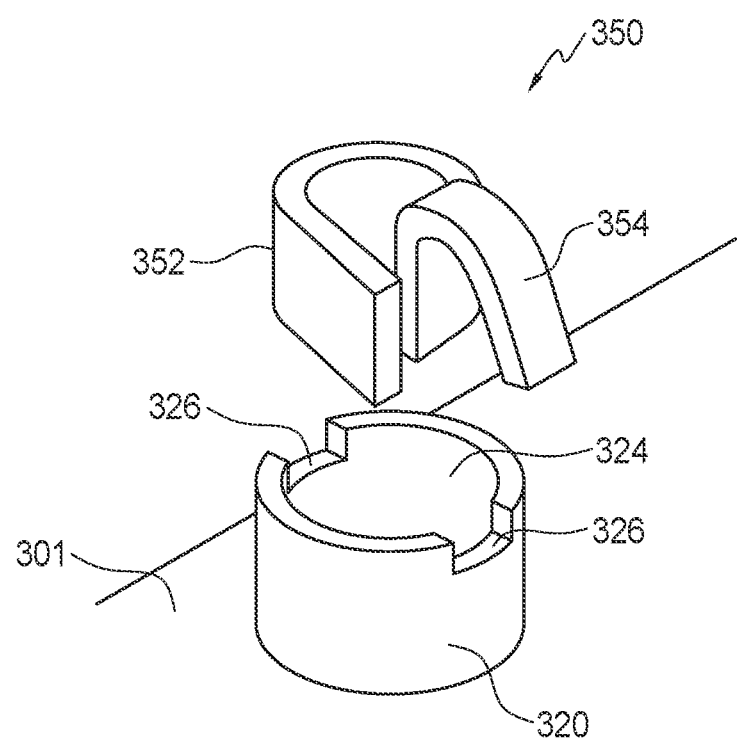
FIG. 9 is a perspective view of the containment device and the wick being inserted into an interior passage of the structural member.

FIGS. 7-9 illustrate a wick 350 that can be used to lubricate the polish rod. The wick 350 can be made of felt or some other material that allows capillary action to take place. The wick 350 can include a wrapping portion 352 and a tail 354. The wrapping portion 352 of the wick 350 can be wrapped around the polish rod passing through the interior passage 324 running through the structural member 320. The tail 354 of the wick 350 can then be positioned to pass through one of the apertures 326 so that an end of the tail 354 hangs down into lubricant contained in the base 301. Through capillary action, the wick 350 will cause lubricant the tail 354 of the wick 350 is in contact with in the base 301 of the containment device 350 to wick up the tail 354 and into the interior passage 324 around the polish rod. In this manner, lubricant can be placed in the base 301 and the wick 350 used to keep the polish rod lubricated as it passes through the interior passage 324 of the structural member 320.

Figure 10:
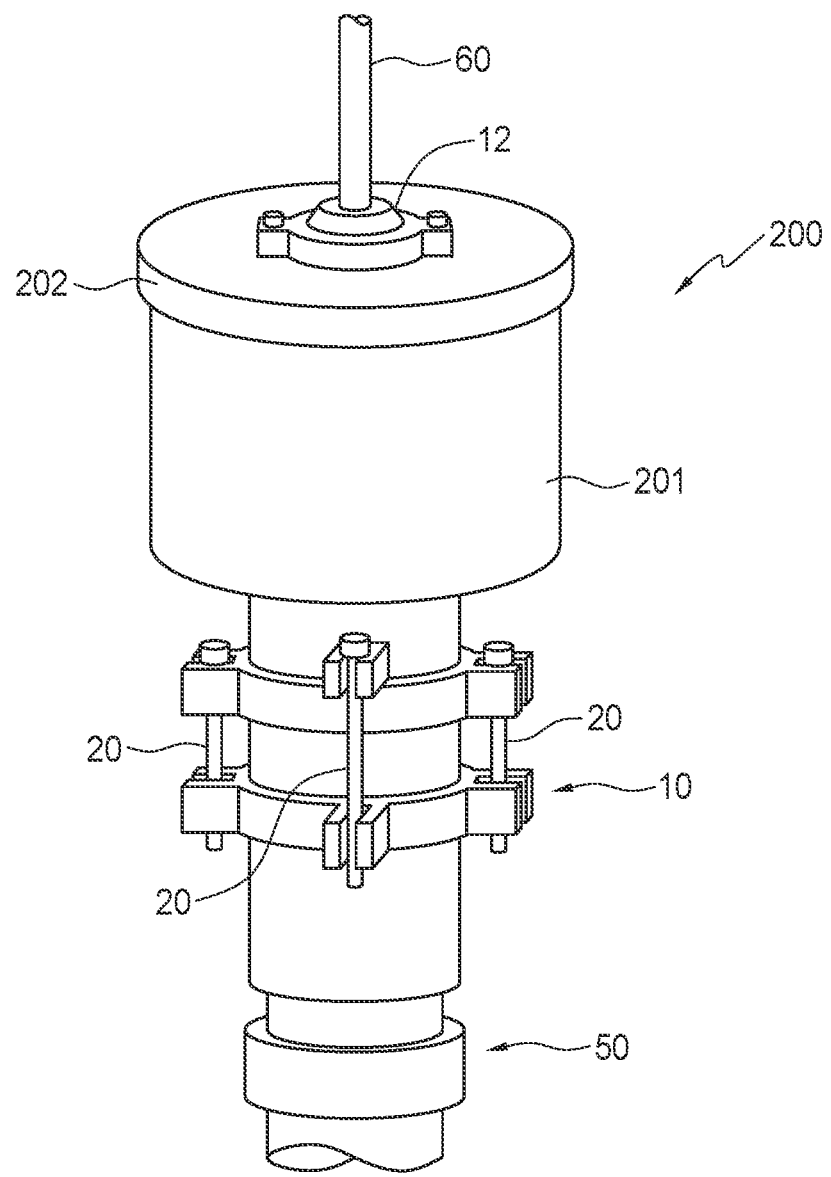
FIG. 10 is a perspective view of a containment device in another aspect.
Figure 11:
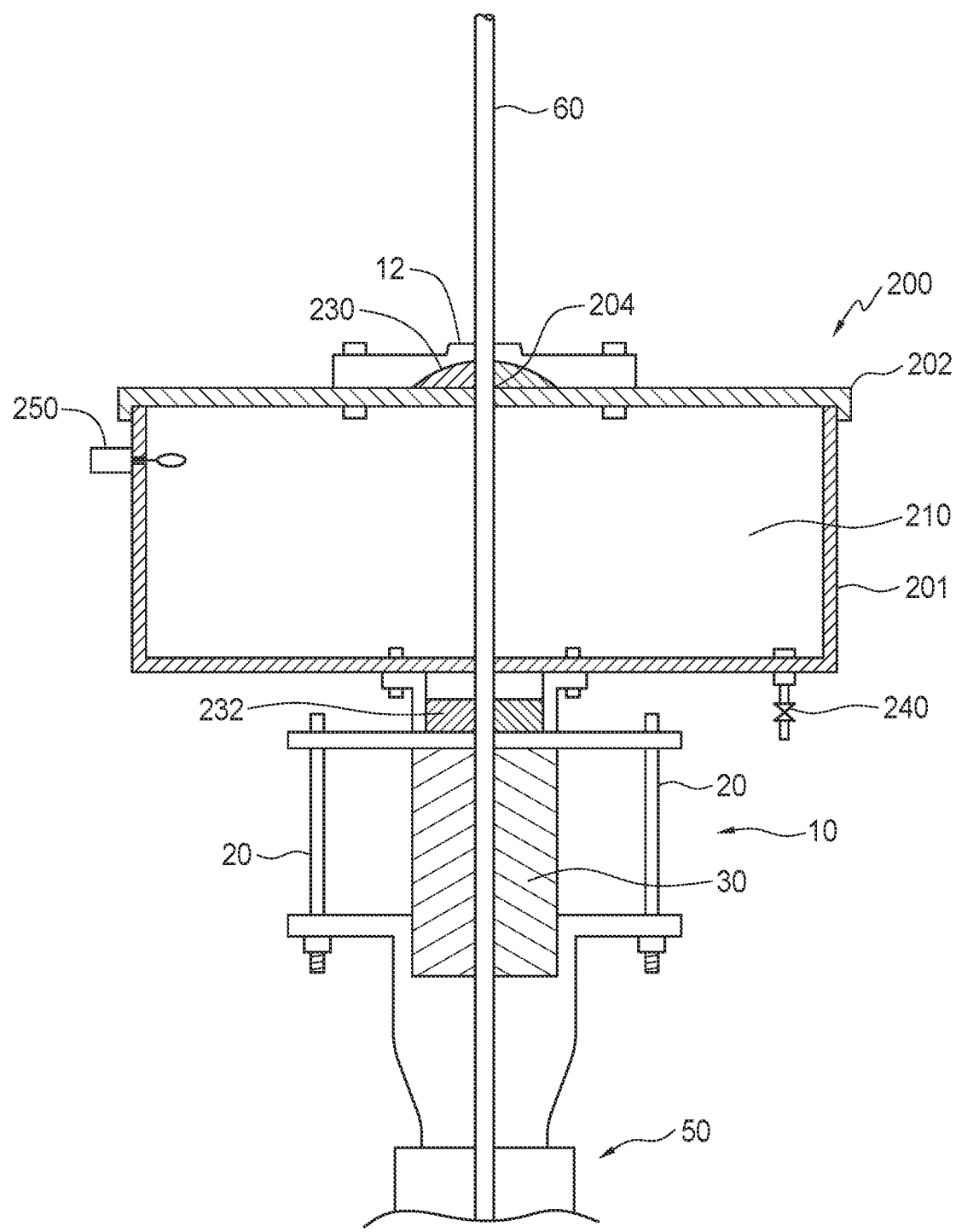
FIG. 11 is a schematic cut-away view of the containment device and stuffing box of FIG. 5.

FIGS. 10 and 11 illustrates a containment device 200 for containing leaks from a stuffing box 10 in a further aspect. The containment device 200 can have a one-piece base 201 that has an interior space 210 for collecting oil or other liquid that has leaked out of the top of a stuffing box and a lid 202. Unlike the containment device 100 shown in FIGS. 2-4, containment device 200 lacks an internal structural member for supporting the pump string when it is hung off the top of the containment device 200. Instead, the outer dimensions of the containment device 200 may be smaller than the containment device 100 and the walls of the containment device 200 may be made thicker and stronger so that the walls of the containment device 200 can support the weight of a pump string being hung off the top of the containment device 200.

The containment device 200 can be attached to the stop of a stuffing box 10 before the pump string is run downhole by taking the dust cap 12 off of the top of the stuffing box 10 and bolting the base 201 of the containment device 200 in place where the dust cap 12 was bolted to the top of the stuffing box 10. Lower packing 232 can be provided between the top of the stuffing box 10 and the bottom of the base 201 of the containment device 200. The dust cap 12 can then be bolted to the top of the lid 202 and the lid 202 and dust cap 12 positioned on the base 201. Upper packing 230 can be provided between the dust cap 12 and the lid 202 of the containment device 200. With the base 201 and the lid 202 of the containment device 200 in place on top of the stuffing box 10 the pump string can be lowered through the dust cap 12 and corresponding opening 204 in the lid 202, through the containment device 200 and into the well through the stuffing box 10 until the polish rod 60 passes through the containment device 200 and the stuffing box 10.

If any oil or other liquid leaks out of the top of the stuffing box 10 past the packing 30 in the stuffing box 10 and makes it through the lower packing 232, it will be contained in the interior space 210 of the containment device 200. The one-piece base 201 can have a seamless interior surface because it is not formed from more than one piece and then connected together around the stuffing box 10, but rather is installed in one-piece on top of the stuffing box 10 before the pump string is lowered through the containment device 200 and into the well through the stuffing box 10.

Similar to the containment device 100, the containment device 200 can have a drain 240 for removing oil or other liquid from the interior space 210 of the containment device 200 and a high-level sensor 150 to indicate when oil or other liquid has reached a specific height in the interior space 210 of the containment device 200.

When work must be performed on the pump string, pump jacket, etc. The pump string can be hung from the top of the containment device 200 and the containment device 200 with its thick sidewalls and narrower outer dimensions can hold the entire weight of the pump string.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method for containing leakage from a stuffing box, the method comprising:
   providing a containment device having:
      a base with a bottom and an open top, the base defining an interior space;
      an opening in the bottom of the base; and
      a lid having an opening aligned with the opening in the bottom of the base when the lid is placed on the base;
   running a polish rod through the opening in the bottom of the base and the interior space of the base;
   attaching the containment device to a top of the stuffing box so that the opening in the bottom of the base aligns with the stuffing box; and
   placing the lid on the base,
   wherein the containment device further comprises a structural member positioned substantially vertically in the interior space of the base, the structural member having an interior passage,
   wherein the polish rod is run through the interior passage, and
   wherein the containment device further comprises at least one aperture passing through the structural member into the interior passage.

2. The method of claim 1 further comprising hanging a pump string from a top of the containment device wherein the containment device holds a weight of the pump string.

3. The method of claim 1 wherein the structural member is a rigid pipe.

4. The method of claim 1 wherein the structural member extends below the bottom of the base.

5. The method of claim 1 wherein the at least one aperture places the interior space of the base in fluid communication with the interior passage of the structural member.

6. The method of claim 1 further comprising installing a dust cap on a top of the lid of the containment device.

7. The method of claim 6 further comprising providing upper packing between the lid of the containment device and the dust cap.

8. The method of claim 7 further comprising providing lower packing between the top of the stuffing box and a bottom end of the structural member.

9. The method of claim 1 further comprising providing lubricant in the interior space to lubricate the polish rod.

10. A method for containing leakage from a stuffing box, the method comprising:
    providing a containment device having:
       a base with a bottom and an open top, the base defining an interior space;
       an opening in the bottom of the base; and
       a lid having an opening aligned with the opening in the bottom of the base when the lid is placed on the base;
    running a polish rod through the opening in the bottom of the base and the interior space of the base;
    attaching the containment device to a top of the stuffing box so that the opening in the bottom of the base aligns with the stuffing box; and
    placing the lid on the base,
    wherein the containment device further comprises a structural member positioned substantially vertically in the interior space of the base, the structural member having an interior passage,
    wherein the polish rod is run through the interior passage, and
    wherein the structural member extends below the bottom of the base.

11. The method of claim 10 further comprising hanging a pump string from a top of the containment device wherein the containment device holds a weight of the pump string.

12. The method of claim 10 wherein the containment device further comprises at least one aperture passing through the structural member into the interior passage.

13. The method of claim 12 wherein the at least one aperture places the interior space of the base in fluid communication with the interior passage of the structural member.

14. The method of claim 10 wherein the structural member is a rigid pipe.

15. The method of claim 10 further comprising installing a dust cap on a top of the lid of the containment device.

16. The method of claim 15 further comprising providing upper packing between the lid of the containment device and the dust cap.

17. The method of claim 16 further comprising providing lower packing between the top of the stuffing box and a bottom end of the structural member.

18. The method of claim 10 further comprising providing lubricant in the interior space to lubricate the polish rod.

\* \* \* \* \*